(12) United States Patent
Ranta et al.

(10) Patent No.: US 11,969,646 B1
(45) Date of Patent: Apr. 30, 2024

(54) NON-CONTACT JOYSTICK POSITION SENSING WITH MAGNETIC, CAPACITIVE, AND INDUCTIVE SENSORS

(71) Applicant: Microsoft Technology Licensing, LLC, Redmond, WA (US)

(72) Inventors: Steven William Ranta, Seattle, WA (US); Ian Hartman Skop, Seattle, WA (US); Edoardo Gastelum Enriquez, Redmond, WA (US); Evan William Mattingly, Vashon, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 198 days.

(21) Appl. No.: 17/507,264

(22) Filed: Oct. 21, 2021

(51) Int. Cl.
*A63F 13/24* (2014.01)

(52) U.S. Cl.
CPC .................................. *A63F 13/24* (2014.09)

(58) Field of Classification Search
CPC ......... G05G 2009/04755; G05G 9/047; G05G 2009/04718; Y10T 74/20201; A63F 13/24
See application file for complete search history.

(56) References Cited

U.S. PATENT DOCUMENTS

2003/0058220 A1* 3/2003 Wang ................. G05G 9/04796
345/161
2003/0107502 A1* 6/2003 Alexander ............. G05G 9/047
345/161

\* cited by examiner

*Primary Examiner* — Peter J Iannuzzi

(57) ABSTRACT

In non-limiting examples of the present disclosure, a user input device is provided. The user-input device may include non-contact magnetic, capacitive, or inductive components for translating movements of a joystick into angular positions. Magnets attached to axial shafts of a joystick assembly may cause changes in voltage in magnetometers on a PCB when the axial shafts are rotated, which may be translated into angular positions of the joystick. Conductors attached to axial shafts of a joystick assembly may cause changes in capacitive charge in capacitors on a PCB when the axial shafts are rotated, which may be translated into angular positions of the joystick. Anisotropic magnetically permeable material and/or excitation components attached to axial shafts of a joystick assembly may cause changes in inductance in inductors on a PCB when the axial shafts are rotated, which may be translated into angular positions of the joystick.

20 Claims, 6 Drawing Sheets

NON-CONTACT JOYSTICK POSITION SENSING WITH MAGNETIC, CAPACITIVE, AND INDUCTIVE SENSORS

BACKGROUND

The main function of a joystick is to expose a control stalk to a user who can move the stalk around a pivot point in order to command a device to move a physical or digital object in a particular direction or path. A gimbal is often used to translate the pivoting stalk into one or more axial outputs that can be coupled to electrical sensing elements. The electrical sensing elements are typically integrated into the joystick assembly and require mounting to a printed circuit board for mechanical and electrical connections.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for determining joystick position of a user-input device utilizing magnetic, capacitive, and inductive electro-mechanical approaches. According to a first example, a user-input device is provided. The user input device comprises a joystick aligned with a printed circuit board on at least a first and second side of the joystick, wherein the joystick is configured to pivot about a gimbal on a first axis and a second axis; a first axial output shaft operatively mounted to the gimbal and configured to rotate upon receiving a movement of the joystick in the first axis; a first magnet connected to a printed circuit board facing edge of the first axial output shaft; a first magnetometer adjacently mounted on the printed circuit board from the first magnet and configured to output a first voltage relative to a rotation of the first axial output shaft and the first magnet; a second axial output shaft operatively mounted to the gimbal and configured to rotate upon receiving a movement of the joystick in the second axis; a second magnet connected to a printed circuit board facing edge of the second axial output shaft; and a second magnetometer adjacently mounted on the printed circuit board from the second magnet and configured to output a second voltage relative to a rotation of the second axial output shaft and the second magnet.

According to an additional example, another user input device is provided. The user-input device comprises a joystick aligned with a printed circuit board on at least a first and second side of the joystick, wherein the joystick is configured to pivot about a gimbal on a first axis and a second axis; a first axial output shaft operatively mounted to the gimbal and configured to rotate upon receiving a movement of the joystick in the first axis; a first capacitor adjacently aligned with the first axial output shaft on the printed circuit board; a first external conductor adjoined to the first axial output shaft and rotatable on the first axial output shaft for changing the capacitance of the first capacitor; a second axial output shaft operatively mounted to the gimbal and configured to rotate upon receiving a movement of the joystick in the second axis; a second capacitor adjacently aligned with the second axial output shaft on the printed circuit board; and a second external conductor adjoined to the second axial output shaft and rotatable on the second axial output shaft for changing the capacitance of the second capacitor.

In another example, another user input device is provided. The user-input device comprises a joystick aligned with a printed circuit board on at least a first and second side of the joystick and configured to pivot about a gimbal on a first axis and a second axis; a first axial output shaft operatively mounted to the gimbal and configured to rotate upon receiving a movement of the joystick in the first axis; a first inductor adjacently aligned with the first axial output shaft on the printed circuit board; a first excitation component adjoined to the first axial output shaft and rotatable on the first axial output shaft for changing the inductance of the first inductor; a second axial output shaft operatively mounted to the gimbal and configured to rotate upon receiving a movement of the joystick in the second axis; a second inductor adjacently aligned with the second axial output shaft on the printed circuit board; and a second excitation component adjoined to the second axial output shaft and rotatable on the second axial output shaft for changing the inductance of the second inductor.

BRIEF DESCRIPTION OF THE DRAWINGS

Non-limiting and non-exhaustive examples are described with reference to the following figures.

DETAILED DESCRIPTION

Figure 1:
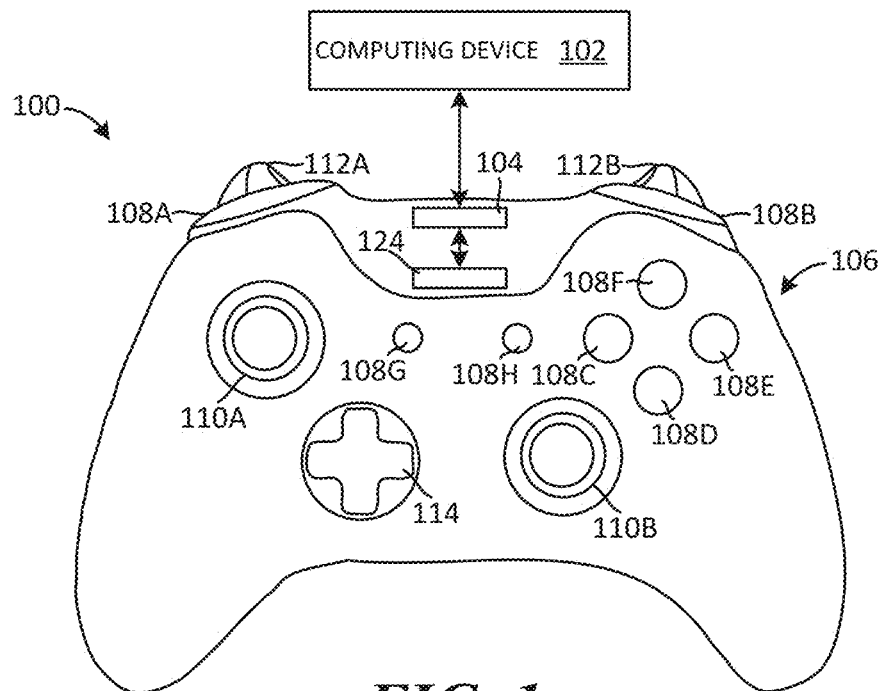
FIGS. 1-2 illustrate an example user-input device.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Non-limiting examples of the present disclosure describe systems, methods, and devices for determining joystick position of a user-input device utilizing magnetic, capacitive, and inductive electro-mechanical approaches. A joystick as referred to herein describes a control stalk included in a user-input device that is maneuverable in two axes. The movement in each axis may be translated via a gimbal, one or more rotatable axial output shafts and a microcontroller for determining a specific angle of the joystick in each axis. In some examples, a joystick may include a thumbpad mounted or otherwise connected to it. Such joysticks may be referred to as "thumbsticks". However, for consistency, joysticks and thumbsticks are both referred to herein as "joysticks".

Axial output shafts of joysticks are typically coupled to electrical sensing elements, primarily implemented as potentiometers. These electrical sensing elements are often integrated into the joystick assembly and require soldering the joystick assembly to a printed circuit board (herein referred to as "PCB") for mechanical and electrical connections. This traditional approach imposes mechanical and electrical constraints that are not desirable in certain joystick implementations.

Examples described herein provide a user-input device that includes a joystick assembly aligned with and/or mounted to a PCB, where the user-input device does not require an electrical sensor mechanically connecting the joystick assembly to the PCB. Rather, the axial outputs of the gimbal may have passive elements that can be sensed externally to the joystick assembly through magnetic, capacitive, and/or inductive components on a PCB that can be located at a position more amenable to a compact assembly (e.g., aligned with the axis of rotation of the gimbal instead of at the bottom of the joystick). The more amenable position may include positioning the passive elements higher in a user-input device (e.g., level with the PCB, above the PCB), leaving additional space in the user-input device for additional and/or larger components (e.g., larger batteries, haptics, additional circuit features).

According to a magnetic approach, a magnet may be affixed to each axial output shaft. As an axial output shaft rotates, the magnetic field emitted from the magnet rotates and can be detected by a corresponding magnetometer on the PCB that is near the magnet, but not touching it. Thus, the output of the magnetometer has a direct correlation to axial rotation and provides appropriate axial sensing of the gimbal in a non-contact way.

In one example of the magnetic approach, a user-input device is provided. The user-input device comprises a joystick aligned with a PCB on at least a first and second side of the joystick. The joystick may be mounted to the PCB or the user-input device structure and configured to pivot about a gimbal on a first axis and a second axis. The user-input device may further comprise a first axial output shaft operatively mounted to the gimbal and configured to rotate upon receiving a movement of the joystick in the first axis; a first magnet connected to the first axis adjacent to a PCB facing edge of the first axial output shaft; a first magnetometer adjacently mounted on the PCB near the first magnet and configured to output a first voltage relative to a rotation of the first axial output shaft and the first magnet; a second axial output shaft operatively mounted to the gimbal and configured to rotate upon receiving a movement of the joystick in the second axis; a second magnet connected to the second axis adjacent to a PCB-facing edge of the second axial output shaft; and a second magnetometer adjacently mounted on the PCB near the second magnet and configured to output a second voltage relative to a rotation of the second axial output shaft and the second magnet.

According to a capacitive approach, an external conductor may be attached to each axial output shaft. Multi-target capacitors on a PCB may be aligned with each axial output shaft and each corresponding external conductor. In some examples, the capacitors may comprise differential capacitors. As an axial output shaft rotates, the capacitance between a first plate and an excitation target increases, while the capacitance between a second plate and the excitation target decreases. Thus, the measurement of the capacitive structure has a direct correlation to axial rotation and provides appropriate axial sensing of the gimbal in a non-contact way.

In one example of the capacitive approach, a user-input device is provided. The user-input device comprises a joystick aligned with a PCB on at least a first and second side of the joystick. The joystick may be mounted to the PCB or the user-input device structure and configured to pivot about a gimbal on a first axis and a second axis. The user-input device may further comprise a first axial output shaft operatively mounted to the gimbal and configured to rotate upon receiving a movement of the joystick in the first axis; a first capacitor adjacently aligned with the first axial output shaft on the PCB; a first external conductor adjoined to the first axial output shaft and rotatable on the first axial output shaft for changing the capacitance of the first capacitor; a second axial output shaft operatively mounted to the gimbal and configured to rotate upon receiving a movement of the joystick in the second axis; a second capacitor adjacently aligned with the second axial output shaft on the PCB; and a second external conductor adjoined to the second axial output shaft and rotatable on the second axial output shaft for changing the capacitance of the second capacitor.

According to a first inductive approach a magnetic material component designed with anisotropic permeability may be attached to each axial output shaft. Inductors located on a PCB may be aligned with each axial output shaft and each corresponding magnetic material to make a magnetically coupled system. As an axial output shaft rotates, the effective inductance produced by an inductor may increase or decrease based on the axial position of the anisotropic permeable material coupled in near field to the inductor. Thus, the measured inductance value of an inductor has a direct correlation to axial rotation and provides appropriate axial sensing of the gimbal in a non-contact way.

According to another inductive approach, a rotary transformer method is implemented. A coupled transformer is created when two or more windings are in close proximity to each other. The maximal amount of mutual coupling between windings occurs when coils are arranged in the same physical orientation to each other (parallel typically) when other factors are constant. As one coil rotates out of optimal alignment to the other, less coupling occurs, and the amount of coupled energy can be used to infer angle from optimal. A primary winding may comprise a fixed orientation inductor on a PCB very near the output of the axial shaft. A secondary isolated winding circuit may comprise a component attached to each axial output shaft. Exciting the primary winding inductor excites a field that interacts with the secondary winding circuit that is attached to the axial output shaft. As an axial output shaft rotates, the mutual inductance created by the winding interaction may increase or decrease based on the position of the excitation component relative to the inductor. These effects can be measured on the primary inductor and have a direct correlation to axial rotation and provides appropriate axial sensing of the gimbal in a non-contact way.

In one example of the inductive approach, a user-input device is provided. The user-input device comprises a joystick aligned with a PCB on at least a first and second side of the joystick. The joystick may be mounted to the PCB or the user-input device structure and configured to pivot about a gimbal on a first axis and a second axis. The user-input device may further comprise a first axial output shaft operatively mounted to the gimbal and configured to rotate upon receiving a movement of the joystick in the first axis; a first inductor adjacently aligned with the first axial output shaft on the PCB; a first excitation component adjoined to the first axial output shaft and rotatable on the first axial output shaft for changing the inductance of the first inductor; a second axial output shaft operatively mounted to the gimbal and configured to rotate upon receiving a movement of the joystick in the second axis; a second inductor adjacently aligned with the second axial output shaft on the PCB; and a second excitation component adjoined to the second axial output shaft and rotatable on the second axial output shaft for changing the inductance of the second inductor.

Figure 2:
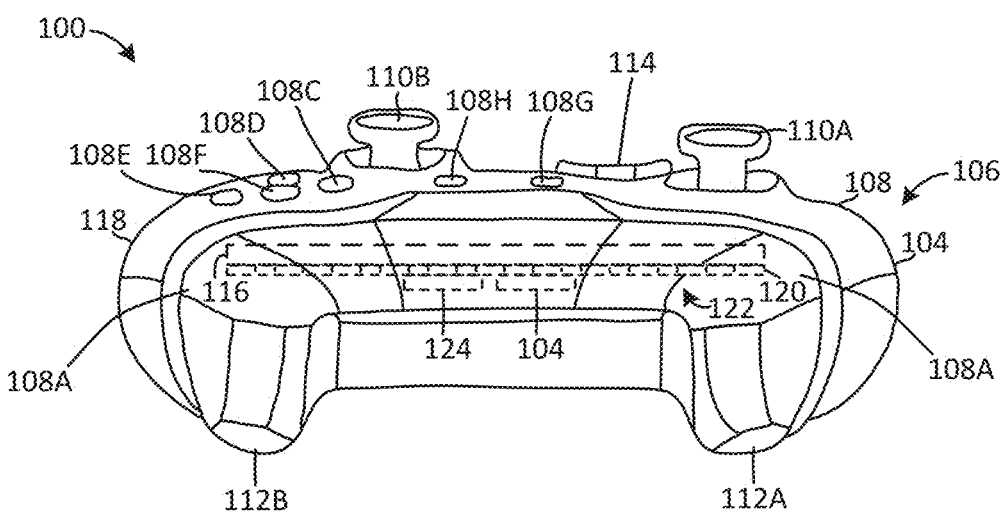

FIGS. 1-2 show an example user-input device in the form of a physical video game controller 100. The game controller 100 is configured to translate user input into control signals. These control signals are provided to a computing device 102, such as a gaming console to control an operating state of the computing device 102. For example, the game controller 100 may translate user input into control signals to control an application (e.g., video game) executed by the computing device 102, or to provide some other form of control. The game controller 100 includes a communication subsystem 104 configured to communicatively couple the game controller 100 with the computing device 102. The communication subsystem 104 may include a wired or wireless connection with the computing device 102. The communication subsystem 104 may include any suitable communication hardware to enable communication according to any suitable communication protocol (e.g., Wi-Fi, Bluetooth). For example, such communicative coupling may enable two-way communication between the game controller 100 and the computing device 102.

The control signals sent from the game controller 100 to the computing device 102 via the communication subsystem 104 may be mapped to commands to control a video game or any other application, or to perform any other computing operations. The computing device 102 and/or the game controller 100 may be configured to map different control signals to different commands based on a state of the computing device 102, the game controller 100, a particular application being executed by the computing device 102, and/or a particular identified user that is controlling the game controller 100 and/or the computing device 102.

The game controller 100 includes a plurality of physical controls 106 configured to generate different control signals responsive to physical manipulation. The physical controls 106 may include a plurality of action buttons 108 (e.g., 108A, 108B, 108C, 108D, 108E, 108F, 108G, and 108H), a plurality of joysticks 110 (e.g., a left joystick 110A and a right joystick 110B), a plurality of triggers 112 (e.g., a left trigger 112A and a right trigger 112B), and a directional pad 114. The game controller 100 may include any number of physical controls, any type of physical controls, any number of electronic input sensors, and any type of electronic input sensors without departing from the scope of this disclosure.

Physical controls 106 may be coupled to one or more frames 116 (shown in FIG. 2). The frame(s) 116 may be contained in a housing 118 of the game controller 100. One or more PCBs 120 may be coupled to the frame(s) 116. Although a single PCB is depicted, in some implementations, two or more PCBs may be employed in the game controller 100. The PCB 120 may include a plurality of electronic input sensors 122. Each electronic input sensor 122 may be configured to generate an activation signal responsive to interaction with a corresponding physical control 106, or may determine a state or characteristic of a corresponding physical control 106. Non-limiting examples of electronic input sensors include dome switches, tactile switches, posture sensors (e.g., Hall Effect sensors), force sensors, speed sensors, potentiometers, magnetic sensors (e.g., magnetometers), inductive sensors, and capacitive sensors. Any suitable sensor may be implemented in the game controller 100.

Each of the action buttons 108 may be configured to activate a corresponding electronic input sensor 122, to generate an activation signal responsive to being depressed (e.g., via physical manipulation). Each of the joysticks 110 may be configured to provide two-dimensional input that is based on a position of the joystick in relation to a default "center" position. For example, the joysticks 110 may interact with non-contact magnetic, capacitive and/or inductive input sensors to provide an analog input control signal. The directional pad 114 may be configured to reside in an "unpressed" posture when no touch force is applied to the directional pad 114. In the unpressed posture, the directional pad 110 does not cause any of the plurality of electronic input sensors 122 to generate an activation signal. Further, the directional pad 114 may be configured to move from the unpressed posture to a selected activation posture responsive to a touch force being applied to the directional pad 114. The selected activation posture may be one of multiple different activation postures that each generate a different activation signal, or a combination of activation signals, by interfacing with different electronic input sensors.

Different aspects of the each of the triggers 112 may be determined by different activation sensors. Each of these sensors may generate one or more activation signals that may be used to control operation of the triggers 112 and/or the computing device 102.

Note that an activation signal produced by an electronic input sensor 122 when a corresponding physical control 106 is in an activation posture may be any signal that differs from a signal or lack thereof produced by the electronic input sensor 122 in the default posture. For example, in some implementations, the activation signal may correspond to a supply voltage (e.g., VDD) of the game controller 100 and the signal produced in the default state may correspond to a relative ground. (e.g., 0). In other implementations, the activation signal may correspond to a relative ground and the signal produced in the default state may correspond to the supply voltage of the game controller 100. An activation signal produced by an electronic input sensor 122 may take any suitable form.

The game controller 100 includes an integrated microcontroller 124 configured to receive activation signals from the plurality of physical controls 106 and send the activation signals to the computing device 102, via the communication subsystem 104. Further, the computing device 102 may use the activation signals to control operation of the computing device 102, such as controlling a video game or other application executed by the computing device 102.

Figure 3:
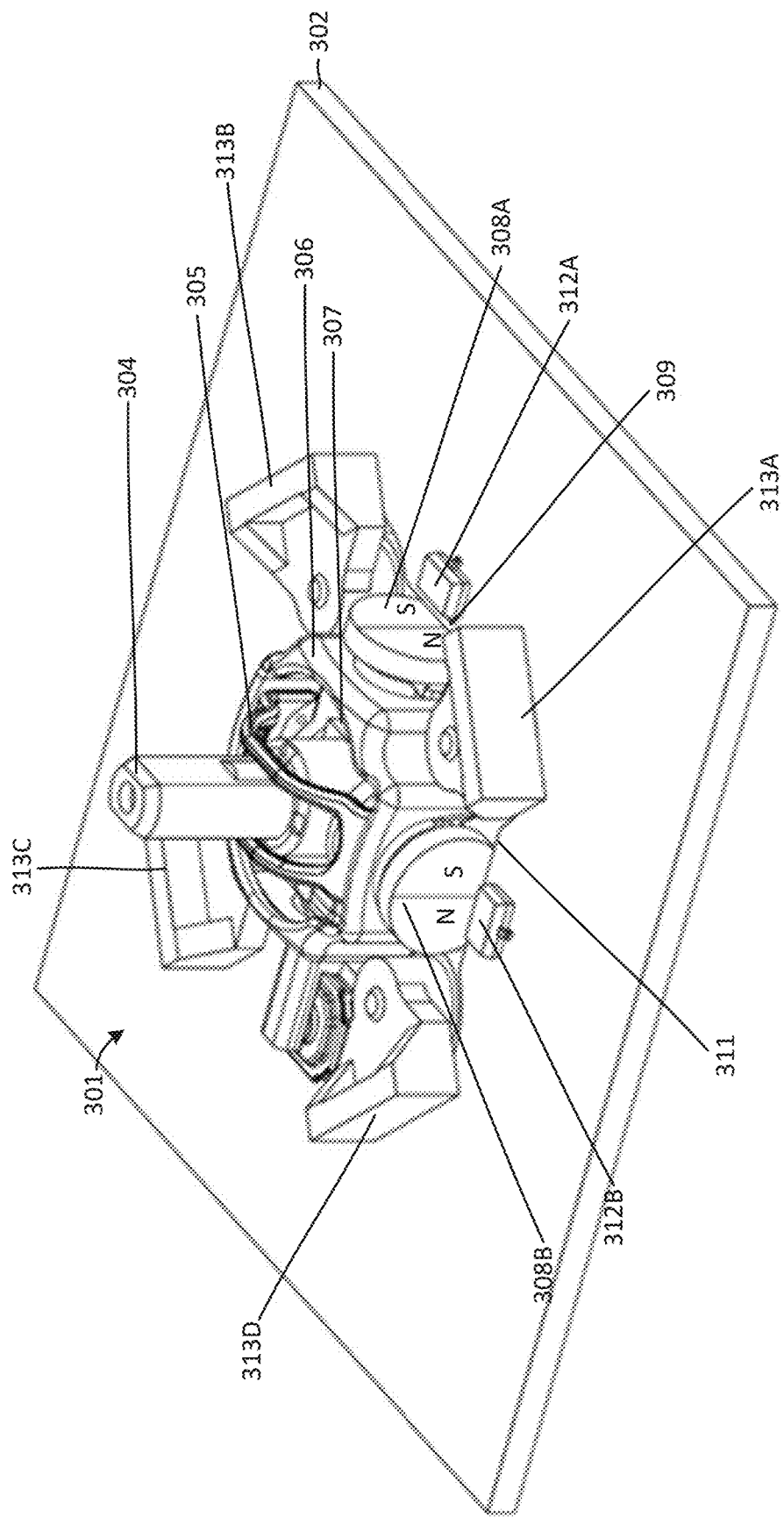
FIG. 3 illustrates an exemplary joystick assembly with a printed circuit board and magnetic components for determining joystick position via an electro-mechanical magnetic approach.

FIG. 3 illustrates an exemplary joystick assembly 301 with a PCB 302 and magnetic components for determining joystick position via an electro-mechanical magnetic approach. FIG. 3 comprises an exemplary joystick assembly 301, which includes a joystick 304. The joystick assembly 301 may be included in a user input device (e.g., a game controller, a remote vehicle controller). The joystick 304 is illustrated without a thumbstick pad for ease of illustration. Additionally, the joystick 304 and the PCB 302 are illustrated without the housing of a game controller for ease of illustration. In addition to the joystick 304, the joystick assembly 301 includes axial frame 306, which limits the movement of the joystick 304 and provides surfaces for mounting the joystick assembly 301 to the PCB 302 and/or one or more user-input device structural frame members 313 such that the joystick 304 can be aligned with the PCB 302 on at least a first and second side of the joystick. In examples, the joystick 304 may be aligned with PCB 302 on all of the joystick 304's sides because it may be included in a cutout of the PCB 302.

The joystick assembly 301 further includes first axis following bracket 305, which converts movements of the joystick 304 in a first axis to a rotation of a corresponding axial output shaft (e.g., axial output shaft 404 in FIG. 4), second axis following bracket 307, which coverts movement of the joystick 304 in a second axis to a rotation of a corresponding axial output shaft. Components 305 and 307 considered together form a gimbal. For example, a movement of the joystick in the Y axis may cause a rotation of an axial output shaft connected to magnet 308A, and a movement of the joystick in the X axis may cause a rotation of an axial output shaft connected to magnet 308B. The direction of rotation may correspond to an up or down movement in the Y axis or a left or right movement in the X axis. For example, an upward movement of the joystick 304 in the Y axis may cause an axial output shaft connected to magnet 308A, and magnet 308A, to rotate in a first direction, and a downward movement of the joystick 304 in the Y axis may cause an axial output shaft connected to magnet 308A, and magnet 308A, to rotate in a second direction. Similarly, a leftward movement of the joystick 304 in the X axis may cause an axial output shaft connected to magnet 308B, and magnet 308B, to rotate in a first direction, and a rightward movement of the joystick 304 in the X axis may cause an axial output shaft connected to magnet 308B, and magnet 308B, to rotate in a second direction.

In this example, magnets 308A and 308B are diametric disk magnets. That is, magnets 308A and 308B are magnetized across their diameters such that the north pole is on one curved side and the south pole is on the opposite curved side. Magnet 308A perpendicularly faces, but is spaced apart from (e.g., does not physically touch) first edge 309 of PCB 302. A first magnetometer 312A is adjacently mounted on the PCB 302 from magnet 308A. The first magnetometer 312A may comprise a Hall Effect Sensor or another magnetic sensor capable of detecting changes in magnetic fields (e.g., Anisotropic Magneto-Resistive ["AMR"] sensors, giant magnetoresistance l"GMR"1 sensors). The first magnetometer 312A is configured to output a voltage that is relative to a rotation of the axial output shaft connected to magnet 308A and therefore the rotation of magnet 308A. The output voltage may be provided to a microcontroller (e.g., microcontroller 124). The microcontroller may convert the output voltage to an angular position of the joystick in the axis corresponding to magnet 308A and its connected axial output shaft. The microcontroller may have been calibrated to convert voltages produced by magnetometer 312A into angular positions of the joystick (e.g., by storing voltages produced by various rotations of magnet 308A and corresponding known angular joystick positions during calibration operations). The distance between magnet 308A and magnetometer 312A may be relative to the strength of magnet 308A and the sensitivity of magnetometer 312A. For example, the distance may be increased with relatively stronger magnets and relatively more sensitive magnetometers. Alternatively, the distance may be decreased with relatively weaker magnets and relatively less sensitive magnetometers.

Magnet 308B perpendicularly faces, but is spaced apart from (e.g., does not physically touch) second edge 311 of PCB 302. A second magnetometer 312B is adjacently mounted on the PCB 302 from magnet 308B. The second magnetometer 312B may comprise a Hall Effect Sensor or another magnetic sensor capable of detecting changes in magnetic fields. The second magnetometer 312B is configured to output a voltage that is relative to a rotation of the axial output shaft connected to magnet 312B and therefore the rotation of magnet 308B. The output voltage may be provided to a microcontroller (e.g., microcontroller 124). The microcontroller may convert the output voltage to an angular position of the joystick in the axis corresponding to magnet 308B and its connected axial output shaft. The microcontroller may have been calibrated to convert voltages produced by magnetometer 312B into angular positions of the joystick (e.g., by storing voltages produced by various rotations of magnet 308B) and corresponding known angular joystick positions during calibration operations). The distance between magnet 308B and magnetometer 312B may be relative to the strength of magnet 308B and the sensitivity of magnetometer 312B. For example, the distance may be increased with relatively stronger magnets and relatively more sensitive magnetometers. Alternatively, the distance may be decreased with relatively weaker magnets and relatively less sensitive magnetometers.

In this example, the magnet 308A (and the axial output shaft it is connected to) and adjacent magnetometer 312A are orthogonally positioned relative to magnet 308B (and the axial output shaft it is connected to) and adjacent magnetometer 312B. In some examples, the magnets, axial output shafts, and/or magnetometers included in joystick assembly 301 may be positioned at various other angles relative to one another. However, the joystick assembly 301 and the microcontroller would have to be calibrated for those specific angles.

In this example, the axial frame 306 is mechanically connected (e.g., with bolts, with screws, with snaps) to the user-input device structural frame members 313 (e.g., user-input device structural frame member 313A, user-input device structural frame member 313B, user-input device structural frame member 313C, user-input device structural frame member 313D). PCB 302 is affixed to the user-input device structural frame members 313 in a way not shown in FIG. 3. Mechanically connecting the axial frame 306 at its midline in relation to the PCB 302 provides the ability to move the PCB 302 to a higher location in a game controller housing as compared to soldering the axial frame 306 to the PCB 302 to accommodate potentiometers as is the case with traditional joystick approaches. The ability to position the joystick assembly 301 at a higher location in a game controller housing provides additional space for larger batteries and other electrical and mechanical components that may not otherwise be able to be included in the housing. Additionally, mechanically connecting the axial frame 306 to the PCB 302 makes replacing joystick assembly 301, or individual pieces of the joystick assembly 301, easier.

Although in this example magnet 308A and magnet 308B are illustrated as being diametric disk magnets, in another example those magnets may comprise axial magnets (e.g., axial rod magnets). In such examples, the axial magnets may be attached at their center points to the axial output shafts, such as in a T shape. Thus, when the axial magnet is rotated via a joystick movement and a corresponding axial output shaft, the change in magnetic field may be determined by a corresponding magnetometer (e.g., magnetometer 312A, magnetometer 312B) and converted to an angle of rotation by a microprocessor.

Figure 4:
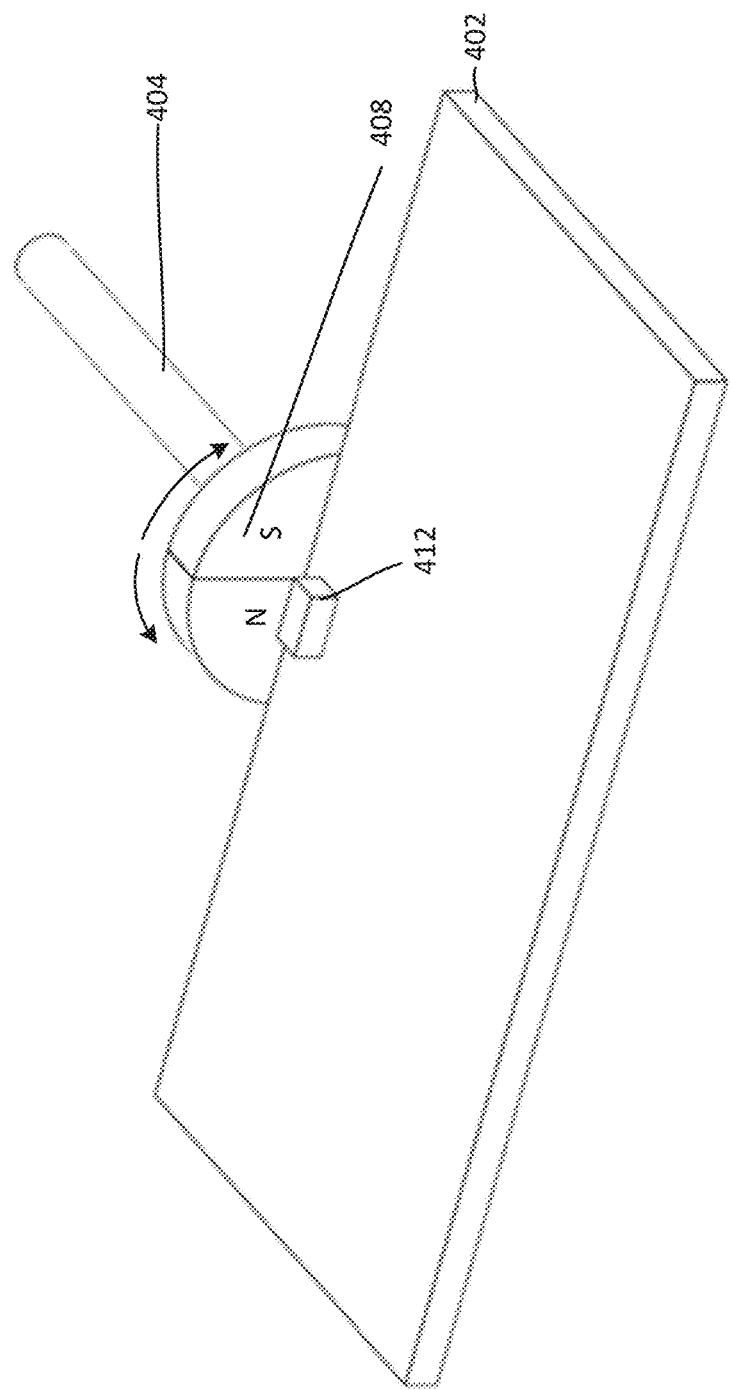
FIG. 4 illustrates exemplary components from a single side of a joystick assembly with a printed circuit board and magnetic components for determining joystick position via an electro-mechanical magnetic approach.

FIG. 4 illustrates exemplary components from a single side of a joystick assembly with a PCB 402 and magnetic components for determining joystick position via an electromechanical magnetic approach. FIG. 4 includes axial output shaft 404 connected to a magnet 408 that is spaced from a PCB 402 and aligned with a magnetometer 412 connected to the PCB 402. The magnet 408 is exemplary of magnet 308A and magnet 308B in FIG. 3. Axial output shaft 404 may be connected to and rotate with a gimbal included in joystick assembly 301. Thus, axial output shaft 404 may rotate clockwise in response to joystick 304 being moved in a first direction, and counterclockwise in response to joystick 304 being moved in a second direction. The rotation of axial output shaft 404 causes magnet 408 to rotate in the same direction that axial output shaft 404 rotates, which causes a magnetic field to change. This change in magnetic field may be detected by magnetometer 412 in the form of a voltage change. The voltage change may be provided to a microcontroller (e.g., microcontroller 124), which may convert that voltage to an angular position in an axis corresponding to the axial output shaft 404.

Figure 5:
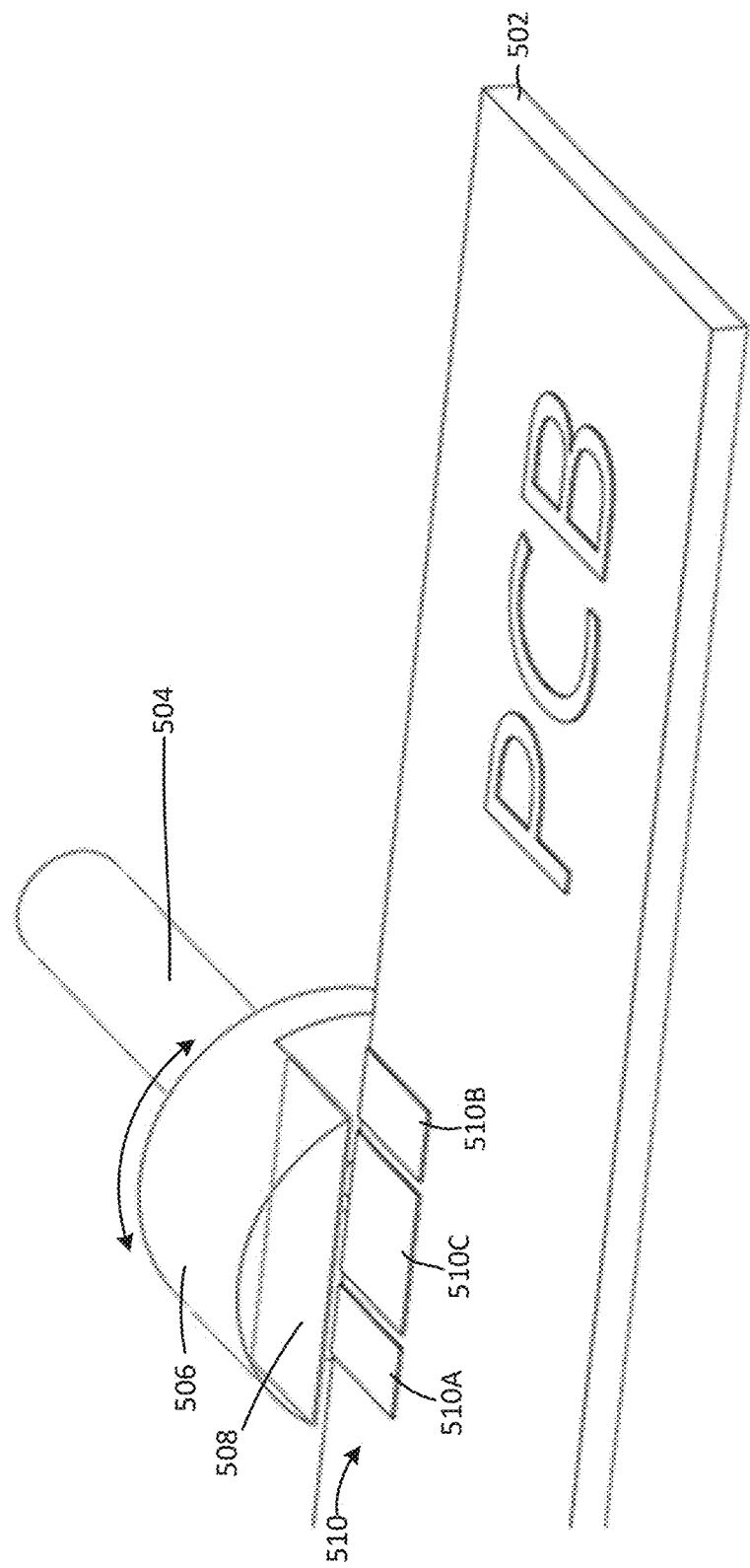
FIG. 5 illustrates exemplary components that may be attached to a joystick assembly, and in associated with a printed circuit board, may be utilized for determining joystick position via an electro-mechanical capacitive approach.

FIG. 5 illustrates exemplary components that may be attached to a joystick assembly, and in association with a PCB, may be utilized for determining joystick position via an electro-mechanical capacitive approach. The exemplary components comprise an exemplary axial output shaft 504, with an external conductor 508 that overhangs a capacitor 510 on a PCB 502. Although for ease of illustration in this example there is only a single axial output shaft which illustrates the conversion of the position of a joystick in a first axis to an angular position of the joystick in that first axis, it should be understood that in practice a second axial output shaft and a second capacitor, positioned orthogonally from axial output shaft 504 and capacitor 510, would be utilized for converting a joystick's position in two axes to two-axis angular positions of the joystick in a user-input device.

In this example, the capacitor 510 is a differential capacitor that includes first capacitive target 510A, second capacitive target 510B, and excitation target 510C. The excitation target 510C is adjacently spaced on a first one of its edges from the first capacitive target 510A on the PCB 502, and adjacently spaced on a second one of its edges from the second capacitive target 510B on the PCB 502. The external conductor 508 is mounted to an overhanging head 506, which is connected to the axial output shaft 504. The external conductor 508 may comprise a material that modulates the capacitance of a capacitor, such as capacitor 510, via an electric field. As one example, the external conductor 508 may be comprised of a material with a strong electrical conductivity (e.g., copper foil). Other materials the external conductor 508 may be comprised of include moderately conductive materials or coatings (e.g. carbon impregnated plastics, metal coatings, conjugated polymers) or high dielectric constant materials or coatings (e.g. titanium dioxide, Barium Titanate). When a movement of the joystick connected to the axial output shaft 504 is received in a first direction, the overhanging head 506 of the axial output shaft 504 rotates in a counterclockwise direction, which causes the external conductor 508 to be positioned closer to the first capacitive target 510A and further from the second capacitive target 510B. Alternatively, when a movement of the joystick connected to the axial output shaft 504 is received in a second direction, the overhanging head 506 of the axial output shaft 504 rotates in a clockwise direction, which causes the external conductor 508 to be positioned closer to the second capacitive target 510B and further away from the first capacitive target 510A.

Thus, when the capacitor 510 is connected to an electrical source on the PCB 502, and the external conductor 508 is positioned a neutral distance from first capacitive target 510A and second capacitive target 510B (e.g., by the joystick being at a neutral location in an axis corresponding to axial output shaft 504), the capacitive charge between the first capacitive target 510A and the excitation target 510C is approximately equal to the capacitive charge between the second capacitive target 510B and the excitation target 510C. Alternatively, if the external conductor 508 is positioned closer to first capacitive target 510A than second capacitive target 510B (e.g., by the joystick being moved in a first direction in the axis corresponding to axial output shaft 504), the capacitive charge between the first capacitive target 510A and the excitation target 510C is greater than the capacitive charge between the second capacitive target 510B and the excitation target 510C. Finally, if the external conductor 508 is positioned closer to the second capacitive target 510B than the first capacitive target 510A (e.g., by the joystick being moved in a second direction in the axis corresponding to axial output shaft 504), the capacitive charge between the second capacitive target 510B and the excitation target 510C is greater than the capacitive charge between the first capacitive target 510A and the excitation target 510C.

A first capacitive sensor may be configured to read and report the capacitive charge between the first capacitive target 510A and the excitation target 510C. A second capacitive sensor may be configured to read and report the capacitive charge between the second capacitive target 510B and the excitation target 510C. The capacitive sensors may be incorporated in the capacitor 510 or they may comprise separate components mounted to the PCB 502. In other examples, a single capacitive sensor may be configured to read and report both capacitive charges.

As such, a microcontroller may be configured to determine an angular position of a joystick in an axis associated with axial output shaft 504 based on a value corresponding to a difference in capacitance between a first capacitive value (e.g., the capacitive charge between the first capacitive target 510A and the excitation target 510C) and a second capacitive value (e.g., the capacitive charge between the second capacitive target 510B and the excitation target 510C). A mirrored operation may be performed for a second axial output shaft, second external conductor, and second capacitor, that is orthogonally posited to the illustrated example in a user input device. Thus, an angular position of a joystick in two axes may be determined via a non-contact electromechanical capacitive solution between the joystick assembly and the PCB.

Although in this example a differential capacitor is utilized to determine an angular position of a joystick, in other examples a capacitor with a single target and/or single capacitive charge may be utilized to determine an angular position of a joystick. For example, the excitation target 508 may be positioned in relation to a single target and/or single charge capacitor such that the capacitance increases in the capacitor when the axial output shaft 504 rotates in a first direction, and decreases when the axial output shaft 504 rotates in a second direction. However, one benefit of the differential capacitor is that additional functions the microcontroller would have to apply related to the humidity and temperature are not as crucial to determining an accurate angular position because the humidity and temperature affect both targets in the differential capacitor approximately equally.

Figure 6:
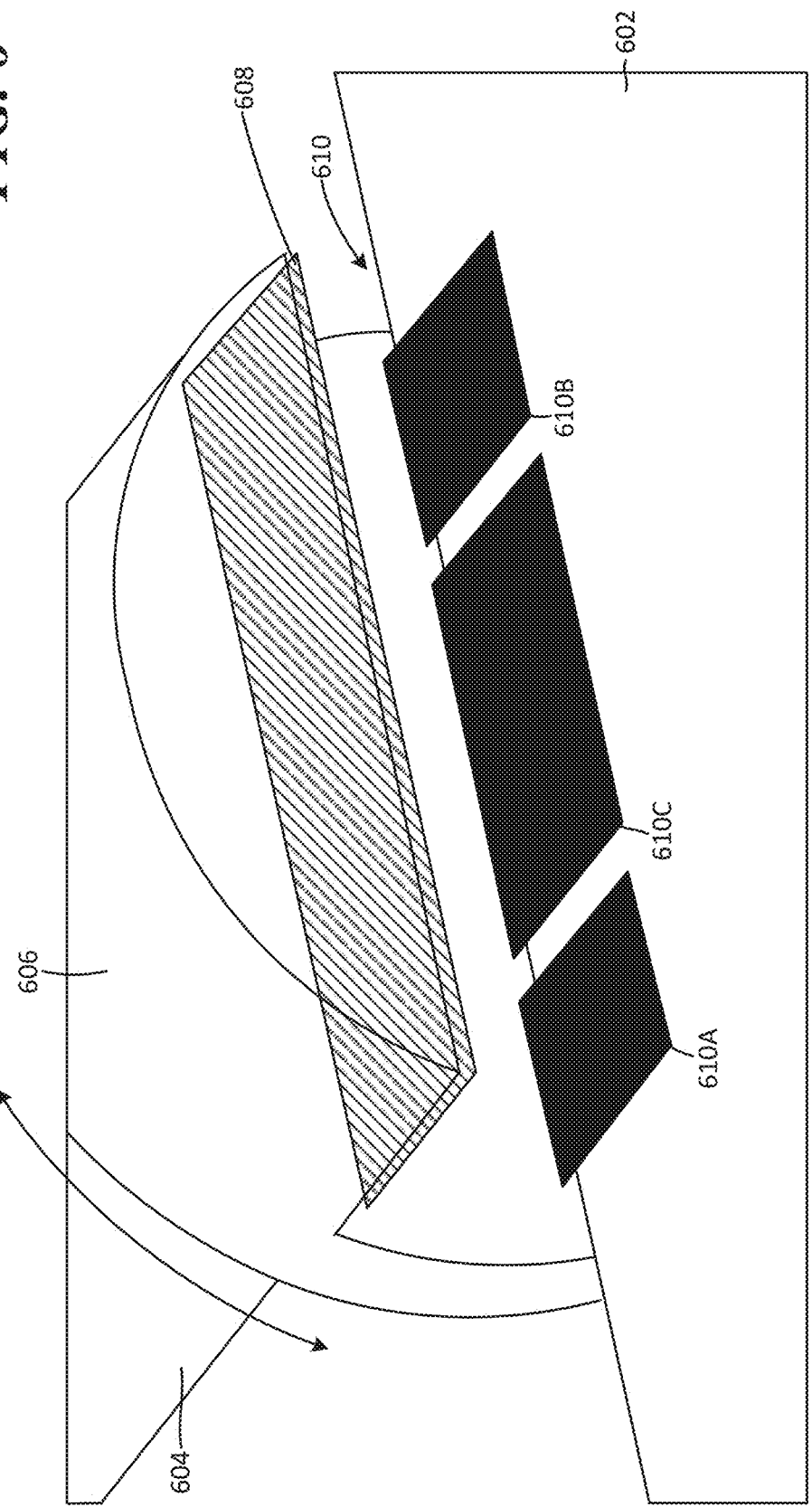
FIG. 6 illustrates another view of the components utilized in FIG. 5 to determine angular position of a joystick of a user input device utilizing an electro-mechanical capacitive approach.

FIG. 6 illustrates another view of the components utilized in FIG. 5 to determine angular position of a joystick of a user input device utilizing an electro-mechanical capacitive approach. FIG. 6 includes axial output shaft 604, which may be attached to a gimbal of a joystick assembly included in a user input device (e.g., a game controller, a remote device controller), and an external conductor 608 mounted to an overhanging head 606 connected to the axial output shaft 604. FIG. 6 further includes a PCB 602, which has a capacitor 610 mounted on it. Capacitor 610 comprises a first capacitive target 610A, a second capacitive target 610B, and an excitation target 510C. Capacitor 610 may be connected to an electrical source and a determination may be made based on the difference in a capacitive charge between the first capacitive target 610A and the excitation target 610C, and a capacitive charge between the second capacitive target 610B and the excitation target 610C, as to an angular position of the joystick in an axis corresponding to the axial output shaft 604.

The user input device may need to be calibrated such that an accurate determination may be made as to an angular position of the joystick based on the difference in capacitive charges. For example, a microcontroller mounted to the PCB may store capacitive values for the capacitor 610 when the joystick is at a neutral location in the axis corresponding to axial output shaft 604 and when the joystick is at one or more non-neutral locations in the axis corresponding to axial output shaft 604.

Figure 7:
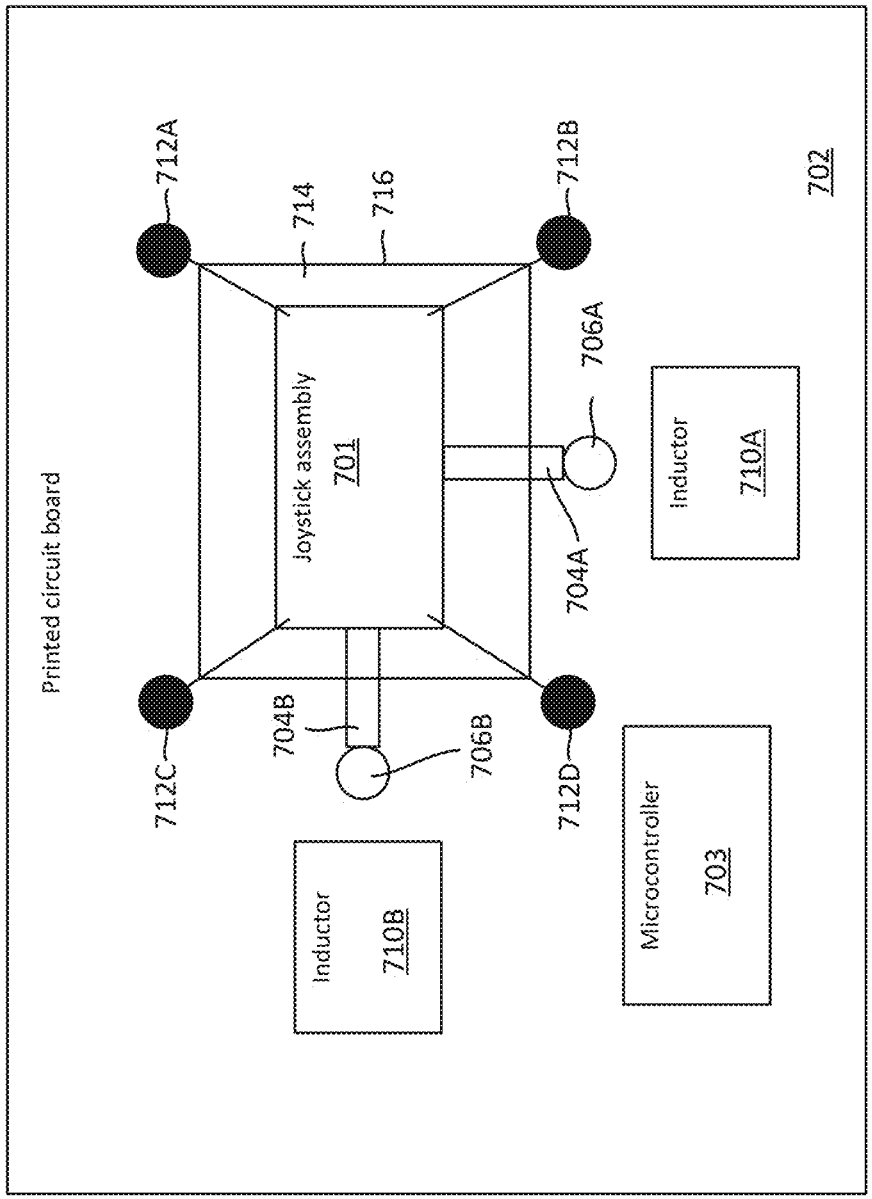
FIG. 7 illustrates exemplary components that may be attached to a joystick assembly, and in association with a printed circuit board, may be utilized for determining joystick position via an electro-mechanical inductive approach.

FIG. 7 illustrates exemplary components that may be attached to a joystick assembly 701, and in association with a PCB 702, may be utilized for determining joystick position via an electro-mechanical inductive approach. The joystick assembly 701 is mounted to the PCB 702 with assembly mounts 712 (e.g., assembly mounts 712A, 712B, 712C, 712D). The assembly mounts 712 may connect the joystick assembly to the PCB 702 across a gap 714 from an edge 716 of PCB 702. The PCB 702 includes inductors 710A and 710B, and microcontroller 703. Inductor 710A is adjacently aligned across the gap 714 from axial output shaft 704A, and inductor 710B is adjacently aligned across the gap 714 from axial output shaft 704B. Although the joystick assembly 701 is illustrated in this example as being mounted to the PCB 702, in other examples the joystick assembly 701 may be mounted to the user-input device that the joystick assembly is included in (e.g., at a midframe assembly of the user-input device). In either example, the joystick assembly 701 is aligned with the PCB 702 on at least a first and second side of the joystick assembly.

The axial output shafts 704 (e.g., axial output shaft 704A, axial output shaft 704B) are orthogonally mounted from one another on the joystick assembly 701 and a gimbal attached to a joystick that is utilized for rotating the axial output shafts 704. Each of the axial output shafts 704 includes and/or is connected to an axial output head 706 (e.g., axial output head 706A, axial output head 706B). Although in this example, the axial output shafts 704 are illustrated as overhanging the edge 716 of the PCB 702, it should be understood that in other examples they may be positioned over the gap 714 and not crossing over the edge 716 of the PCB 702.

In some examples, the axial output head 706 of each of the axial output shafts 704 may comprise or be connected to a component comprising a magnetically anisotropic permeable material, such as laminated steel structures or magnetically grain-oriented composite plastics. The inductance of inductors 710 may increase or decrease based on the position and/or distance between inductors 710 and the anisotropic magnetic permeability components. For example, the anisotropic magnetic permeability components may be shaped or positioned on the axial output heads 706 such that more or less of the magnetic field produced by inductors 710 is coupled to the anisotropic magnetic permeability components when the axial output shaft 704 rotates. Thus, the apparent inductance measured at inductors 710 is directly influenced by the axial rotation of anisotropic magnetic permeability influencing the magnetic field produced by the inductor (all excitation and environmental influences compensated for.)

One or more inductive sensors on PCB 702 may be configured to read and report the inductance of the inductors 710. The one or more inductive sensors may be integrated with the inductors 710 or they may be separate components. The microcontroller 703 may be configured to determine an angular position of the joystick in a first axis associated with axial output shaft 704A based on the inductance produced by inductor 710A, where the inductance changes based on the rotation of axial output shaft 704A. Similarly, the microcontroller 703 may be configured to determine an angular position of the joystick in a second axis associated with axial output shaft 704B based on the inductance produced by inductor 710B, where the inductance changes based on the rotation of axial output shaft 704B. Thus, an angular position of a joystick in two axes may be determined via a non-contact electro-mechanical inductive solution between the joystick assembly and the PCB.

In additional examples, rather than having anisotropic magnetic permeability components mounted to the axial output shafts 704, excitation components may be mounted to each of the axial output shafts 704. In some examples, the excitation components may comprise secondary inductors. The excitation components may be shaped and/or positioned on the axial output heads 706 such that they induce additional induction from the inductors 710 on the PCB 702 when the axial output shafts 704 rotate in a first direction (e.g., clockwise, counterclockwise), and induce no additional induction from the inductors 710 on the PCB 702 when the axial output shafts 704 rotate in a second direction (e.g., clockwise, counterclockwise). In such examples, one or more inductive sensors on the PCB 702 may be configured to read and report the inductance of the inductors 710. The one or more inductive sensors may be integrated with inductors 710 or they may be separate components. The microcontroller 703 may be configured to determine an angular position of the joystick in a first axis associated with axial output shaft 704A based on the inductance produced by inductor 710A, where the inductance changes based on the rotation of axial output shaft 704A. Similarly, the microcontroller 703 may be configured to determine an angular position of the joystick in a second axis associated with axial output shaft 704B based on the inductance produced by inductor 710B, where the inductance changes based on the rotation of axial output shaft 704B. Thus, an angular position of a joystick in two axes may be determined via a non-contact electro-mechanical inductive solution between the joystick assembly and the PCB.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A user-input device comprising:
    a joystick aligned with a printed circuit board on at least a first and second side of the joystick, wherein the joystick is configured to pivot about a gimbal on a first axis and a second axis;
    a first axial output shaft operatively mounted to the gimbal and configured to rotate upon receiving a movement of the joystick in the first axis;
    a first magnet connected to a printed circuit board facing edge of the first axial output shaft, wherein the first magnet is one of a diametric disk magnet or an axial rod magnet;
    a first magnetometer adjacently mounted on the printed circuit board from the first magnet and configured to output a first voltage relative to a rotation of the first axial output shaft and the first magnet;
    a second axial output shaft operatively mounted to the gimbal and configured to rotate upon receiving a movement of the joystick in the second axis;
    a second magnet connected to a printed circuit board facing edge of the second axial output shaft; and
    a second magnetometer adjacently mounted on the printed circuit board from the second magnet and configured to output a second voltage relative to a rotation of the second axial output shaft and the second magnet.

2. The user-input device of claim 1, wherein the user-input device further comprises a microcontroller that includes calibrated instructions for:
    converting voltages from the first magnetometer to angular positions of the joystick in the first axis; and
    converting voltages from the second magnetometer to angular positions of the joystick in the second axis.

3. The user-input device of claim 1, wherein the user-input device further comprises a microcontroller that:
    receives the first output voltage and converts it to an angular position of the joystick in the first axis; and
    receives the second output voltage and converts it to an angular position of the joystick in the second axis.

4. The user-input device of claim 3, further comprising:
    a communication subsystem communicatively coupled to a computing device and operative to:
        send the angular position of the joystick in the first axis to the computing device; and
        send the angular position of the joystick in the second axis to the computing device.

5. The user-input device of claim 1, wherein the first axial output shaft is orthogonally positioned on the gimbal relative to the second axial output shaft.

6. The user-input device of claim 1, wherein:
    the first magnet is a diametric disk magnet;
    the diametric disk magnet has a first flat end and a second flat end; and
    the first flat end is connected to the printed circuit board facing edge of the first axial output shaft.

7. The user-input device of claim 6, wherein the first magnet has a first polarity on a first side of the first and second flat ends and a second polarity on a second side of the first and second flat ends, and wherein the first side of the first and second flat ends and the second side of the first and second flat ends are perpendicularly positioned to the printed circuit board.

8. The user-input device of claim 1, wherein:
    the first magnet is an axial rod magnet;
    the axial rod magnet has a first portion with a first polarity, a second portion with a second polarity, and a center portion between the first portion and the second portion; and
    the center portion is connected to the printed circuit board facing edge of the first axial output shaft.

9. The user-input device of claim 8, wherein the first portion of the axial rod magnet is adjacently aligned with an edge of the printed circuit board, and the second portion of the axial rod magnet is adjacently aligned with the edge of the printed circuit board.

10. The user-input device of claim 1, wherein:
    the first magnet is positioned within a specific distance from the first magnetometer based on the strength of the first magnet and a sensitivity of the first magnetometer.

11. A user-input device comprising:
    a joystick aligned with a printed circuit board on at least a first and second side of the joystick, wherein the joystick is configured to pivot about a gimbal on a first axis and a second axis;
    a first axial output shaft operatively mounted to the gimbal and configured to rotate upon receiving a movement of the joystick in the first axis;
    a first capacitor adjacently aligned with the first axial output shaft on the printed circuit board, wherein the first capacitor is a differential capacitor comprising a first excitation target, a first capacitive target, and a second capacitive target;

a first external conductor adjoined to the first axial output shaft and rotatable on the first axial output shaft for changing the capacitance of the first capacitor, the first capacitive target, and the second capacitive target, wherein the first external conductor overhangs the first capacitor;

a second axial output shaft operatively mounted to the gimbal and configured to rotate upon receiving a movement of the joystick in the second axis;

a second capacitor adjacently aligned with the second axial output shaft on the printed circuit board, wherein the second capacitor is a differential capacitor comprising a second excitation target, a third capacitive target, and a fourth capacitive target; and a second external conductor adjoined to the second axial output shaft and rotatable on the second axial output shaft for changing the capacitance of the second capacitor, the third capacitive target, and the fourth capacitive target, wherein the second external conductor overhangs the second capacitor.

12. The user-input device of claim 11, further comprising:
a microcontroller configured to determine an angular position of the joystick in the first axis from a capacitance of the first capacitor and an angular position of the joystick in the second axis from a capacitance of the second capacitor.

13. The user-input device of claim 12, further comprising:
a first capacitive sensor configured to determine a capacitance of the first capacitive target;
a second capacitive sensor configured to determine a capacitance of the second capacitive target;
a third capacitive sensor configured to determine a capacitance of the third capacitive target;
a fourth capacitive sensor configured to determine a capacitance of the fourth capacitive target; and
wherein:
the microcontroller is configured to determine the angular position of the joystick in the first axis from a difference in capacitance between the first capacitive target and the second capacitive target, and
the microcontroller is configured to determine the angular position of the joystick in the second axis from a difference in capacitance between the third capacitive target and the fourth capacitive target.

14. The user-input device of claim 11, wherein:
the first external conductor is configured to increase a distance between the first external conductor and the first capacitive target and decrease a distance between the first external conductor and the second capacitive target when the first axial output shaft is rotated in a first direction;
the first external conductor is configured to decrease the distance between the first external conductor and the first capacitive target and increase the distance between the first external conductor and the second capacitive target when the first axial output shaft is rotated in a second direction;
the second external conductor is configured to increase a distance between the second external conductor and the third capacitive target and decrease a distance between the second external conductor and the fourth capacitive target when the second axial output shaft is rotated in a first direction; and
the second external conductor is configured to decrease the distance between the second external conductor and the third capacitive target and increase the distance between the second external conductor and the fourth capacitive target when the second axial output shaft is rotated in a second direction.

15. The user-input device of claim 11, wherein:
the first excitation target is adjacently spaced on a first edge of the first excitation target from the first capacitive target on the printed circuit board;
the first excitation target is adjacently spaced on a second edge of the first excitation target, that is parallel to the first edge of the first excitation target, from the first capacitive target on the printed circuit board;
the second excitation target is adjacently spaced on a first edge of the second excitation target from the third capacitive target on the printed circuit board; and
the second excitation target is adjacently spaced on a second edge of the second excitation target, that is parallel to the first edge of the second excitation target, from the second capacitive target on the printed circuit board.

16. The user-input device of claim 11, wherein the first external conductor comprises copper foil.

17. The user-input device of claim 11, wherein the first external conductor comprises carbon impregnated plastic.

18. A user-input device comprising:
a joystick aligned with a printed circuit board on at least a first and second side of the joystick and configured to pivot about a gimbal on a first axis and a second axis, wherein the joystick is positioned over a gap in the printed circuit board;
a first axial output shaft operatively mounted to the gimbal and configured to rotate upon receiving a movement of the joystick in the first axis;
a first inductor adjacently aligned with the first axial output shaft across the gap on the printed circuit board;
a first excitation component adjoined to the first axial output shaft and rotatable on the first axial output shaft for changing the inductance of the first inductor;
a second axial output shaft operatively mounted to the gimbal and configured to rotate upon receiving a movement of the joystick in the second axis;
a second inductor adjacently aligned with the second axial output shaft across the gap on the printed circuit board; and
a second excitation component adjoined to the second axial output shaft and rotatable on the second axial output shaft for changing the inductance of the second inductor.

19. The user-input device of claim 18, further comprising:
a microcontroller configured to determine an angular position of the joystick in the first axis from an inductance of the first inductor and an angular position of the joystick in the second axis from an inductance of the second inductor.

20. The user-input device of claim 18, further comprising:
a first sensor configured to absorb and detect a strength of a magnetic field emanating from the first inductor; and
a second sensor configured to absorb and detect a strength of a magnetic field emanating from the second inductor.

* * * * *